US008399595B2

(12) United States Patent
Tribelhorn et al.

(10) Patent No.: US 8,399,595 B2
(45) Date of Patent: Mar. 19, 2013

(54) TWO PART POLYURETHANE CURABLE COMPOSITION HAVING SUBSTANTIALLY CONSISTENT G-MODULUS ACROSS THE RANGE OF USE TEMPERATURES

(75) Inventors: Ulrich Tribelhorn, Ebikon (CH); Renate R. Herger Hassan, Obstalden (CH)

(73) Assignee: Dow Global Technologies LLC, Midland, MI (US)

( * ) Notice: Subject to any disclaimer, the term of this patent is extended or adjusted under 35 U.S.C. 154(b) by 618 days.

(21) Appl. No.: 12/177,706

(22) Filed: Jul. 22, 2008

(65) Prior Publication Data

US 2009/0044907 A1    Feb. 19, 2009

Related U.S. Application Data

(60) Provisional application No. 60/961,577, filed on Jul. 23, 2007.

(51) Int. Cl.
*C08G 18/10* (2006.01)

(52) U.S. Cl. ............... 528/59; 528/60; 528/61; 528/66; 528/67; 528/77; 528/85; 252/182.2; 252/182.21; 252/182.22; 156/331.1; 156/331.4; 156/331.7

(58) Field of Classification Search .............. 528/59, 528/60, 61, 66, 67, 76, 77, 85, 904, 905; 156/331.1, 331.4, 331.7; 252/182.2, 182.21, 252/182.22
See application file for complete search history.

(56) References Cited

U.S. PATENT DOCUMENTS

| 3,153,002 | A | * | 10/1964 | Foote et al. ............... 521/131 |
| 3,707,521 | A | | 12/1972 | De Santis |
| 3,779,794 | A | | 12/1973 | De Santis |
| 4,374,237 | A | | 2/1983 | Berger et al. |
| 4,444,704 | A | * | 4/1984 | Hira et al. ............... 264/45.5 |

(Continued)

FOREIGN PATENT DOCUMENTS

| CA | 2 154 243 A1 | 1/1996 |
| EP | 0411432 | 2/1991 |

(Continued)

OTHER PUBLICATIONS

Kunststoff Handbuch Polyurethan, Oertel, Hanser Verlag, 11.3 Two-Component Reaction Adhesives, pp. 598-601.

(Continued)

*Primary Examiner* — Michael L Leonard
(74) *Attorney, Agent, or Firm* — The Dobrusin Law Firm, P.C.

(57) ABSTRACT

The invention is a two part composition comprising:
A. an isocyanate functional group containing component comprising one or more polyisocyanates and one or more isocyanate functional group containing prepolymers having in its backbone the residue of one or more chains derived from polypropylene oxide, copolymers of ethylene oxide and propylene oxide or mixtures thereof wherein equivalent weight of the chains are predominantly about 780 or greater;
B. an isocyanate reactive component comprising one or more polypropylene oxide, copolymers of ethylene oxide and propylene oxide or mixtures thereof having equivalent weights predominantly about 960 or greater and terminal groups which are reactive with isocyanate groups;
C. one or more low molecular weight compounds having two or more isocyanate reactive groups and a molecular weight of 120 or less wherein the low molecular weight compounds are present as a residue in the isocyanate functional group containing prepolymer, as a component of the isocyanate reactive component or both;
D. one or more catalysts for the reaction of isocyanate functional groups with isocyanate reactive groups wherein the catalyst may be located in the isocyanate functional group containing component or the isocyanate reactive component.

20 Claims, 2 Drawing Sheets

U.S. PATENT DOCUMENTS

| | | | |
|---|---|---|---|
| 4,525,511 A | | 6/1985 | Kirby et al. |
| 4,538,920 A | | 9/1985 | Drake |
| 4,552,934 A | | 11/1985 | Rabito et al. |
| 4,621,113 A | * | 11/1986 | Collins .................. 524/196 |
| 4,659,779 A | | 4/1987 | Bagga et al. |
| 4,687,533 A | | 8/1987 | Rizk et al. |
| 4,728,710 A | | 3/1988 | Goel |
| 4,739,019 A | | 4/1988 | Schappert et al. |
| 4,743,672 A | * | 5/1988 | Goel ........................ 528/44 |
| 4,780,520 A | | 10/1988 | Rizk et al. |
| 4,824,888 A | | 4/1989 | Emmerling et al. |
| 4,828,755 A | | 5/1989 | Kasumgar |
| 4,843,138 A | * | 6/1989 | Tazewell et al. ............. 528/52 |
| 4,876,308 A | | 10/1989 | Melby et al. |
| 4,910,279 A | | 3/1990 | Gillis et al. |
| 5,002,806 A | | 3/1991 | Chung |
| 5,041,517 A | | 8/1991 | Vu et al. |
| 5,063,269 A | | 11/1991 | Hung |
| 5,073,601 A | | 12/1991 | Mülhaupt et al. |
| 5,082,147 A | | 1/1992 | Jacobs |
| 5,143,996 A | | 9/1992 | Chung et al. |
| 5,162,457 A | | 11/1992 | Hansel |
| 5,164,473 A | | 11/1992 | Dormish et al. |
| 5,166,300 A | | 11/1992 | Rumon |
| 5,175,228 A | | 12/1992 | Wang et al. |
| 5,194,502 A | | 3/1993 | Saito et al. |
| 5,278,257 A | | 1/1994 | Mülhaupt et al. |
| 5,340,901 A | | 8/1994 | Wang |
| 5,354,609 A | | 10/1994 | Wang |
| 5,367,036 A | | 11/1994 | Saito et al. |
| 5,536,805 A | * | 7/1996 | Kangas ..................... 528/59 |
| 5,548,056 A | | 8/1996 | Chung |
| 5,603,798 A | | 2/1997 | Bhat |
| 5,623,044 A | | 4/1997 | Chiao |
| 5,631,318 A | | 5/1997 | Ito et al. |
| 5,672,229 A | | 9/1997 | Konig et al. |
| 5,698,656 A | | 12/1997 | Ohashi et al. |
| 5,719,252 A | * | 2/1998 | Dormish et al. ............. 528/65 |
| 5,744,088 A | | 4/1998 | Cuyper |
| 5,747,581 A | | 5/1998 | Proebster |
| 5,852,103 A | | 12/1998 | Bhat |
| 5,852,137 A | | 12/1998 | Hsieh et al. |
| 5,922,809 A | | 7/1999 | Bhat et al. |
| 5,951,796 A | | 9/1999 | Murray |
| 5,976,305 A | | 11/1999 | Bhat et al. |
| 6,001,204 A | | 12/1999 | Haig et al. |
| 6,015,475 A | | 1/2000 | Hsieh |
| 6,133,398 A | | 10/2000 | Bhat et al. |
| 6,242,555 B1 | * | 6/2001 | Du Prez et al. ............. 528/52 |
| RE37,386 E | | 9/2001 | Melby et al. |
| 6,423,810 B1 | * | 7/2002 | Huang et al. ............... 528/77 |
| 6,512,033 B1 | | 1/2003 | Wu |
| 6,709,539 B2 | | 3/2004 | Zhou |
| 6,749,943 B1 | | 6/2004 | Tangen et al. |
| 6,767,959 B2 | | 7/2004 | Bosshard et al. |
| 6,776,869 B1 | | 8/2004 | Schenkel |
| 6,866,743 B2 | | 3/2005 | Paulsen et al. |
| 6,965,008 B2 | | 11/2005 | Symietz et al. |
| 7,101,950 B2 | | 9/2006 | Zhou et al. |
| 7,361,292 B2 | * | 4/2008 | Zhou ........................ 252/511 |
| 7,615,595 B2 | | 11/2009 | Lutz et al. |
| 7,771,622 B2 | | 8/2010 | Zhou |
| 2002/0100550 A1 | | 8/2002 | Mahdi et al. |
| 2004/0266899 A1 | | 12/2004 | Muenz et al. |
| 2005/0054764 A1 | | 3/2005 | Zhou et al. |
| 2005/0070634 A1 | | 3/2005 | Lutz et al. |
| 2005/0209401 A1 | | 9/2005 | Lutz et al. |
| 2006/0096694 A1 | | 5/2006 | Zhou |
| 2006/0205897 A1 | | 9/2006 | Frick et al. |
| 2006/0276601 A1 | | 12/2006 | Lutz et al. |
| 2006/0293489 A1 | | 12/2006 | Zhou et al. |
| 2008/0149257 A1 | | 6/2008 | Tribelhorn et al. |
| 2008/0185098 A1 | | 8/2008 | Wu et al. |
| 2009/0044907 A1 | | 2/2009 | Tribelhorn et al. |

FOREIGN PATENT DOCUMENTS

| | | |
|---|---|---|
| EP | 0676427 | 3/1995 |
| EP | 0 819 749 A2 | 1/1998 |
| EP | 0 849 343 A1 | 6/1998 |
| EP | 0699698 | 2/2001 |
| EP | 0705287 | 10/2002 |
| EP | 1 524 282 A1 | 4/2005 |
| EP | 1 602 702 A1 | 12/2005 |
| EP | 1671996 | 6/2006 |
| EP | 1433802 | 10/2007 |
| JP | 2-011616 A | 1/1990 |
| JP | 3-043481 A | 2/1991 |
| WO | 96 21 688 A1 | 7/1996 |
| WO | 02/062864 A2 | 8/2002 |
| WO | 02/092 714 A1 | 11/2002 |
| WO | WO2004/056903 | 7/2004 |
| WO | 2005/019292 A1 | 3/2005 |
| WO | 2006/052505 A1 | 5/2006 |

OTHER PUBLICATIONS

Journal of Material Science, vol. 34, No. 11, Jun. 1, 1999, pp. 2523-2527, Bae J.Y. et al.

International Search Report and Written Opinion dated Jan. 18, 2010 for related PCT US/09/050461 filed Jul. 14, 2009 and Published as WO 2010/021793 on Feb. 25, 2010.

IPER dated Dec. 2, 2010 for related PCT US/09/050461 filed Jul. 14, 2009 and Published as WO 2010/021793 on Feb. 25, 2010.

Kohler et al., "An Apparatus for Determining Both the Quantity of Gas Evolved and the Amount of Reagent Consumed in Reactions with Methyl Magnesium Iodide" Journal of the American Chemical Society, 1927, 3181, 49.

Sika Tack-ASAP, "Hot Applied Windshield Adhesive" Technical Sheet, Jul. 2003, Sika Corporation.

\* cited by examiner

TWO PART POLYURETHANE CURABLE COMPOSITION HAVING SUBSTANTIALLY CONSISTENT G-MODULUS ACROSS THE RANGE OF USE TEMPERATURES

CLAIM OF PRIORITY

This application claims priority from Provisional Application Ser. No. 60/961,577 filed Jun. 24, 2007, incorporated herein by reference in its entirety.

FIELD OF INVENTION

The invention relates to a two part polyurethane adhesive for bonding substrates together which exhibits a low change in G-modulus over the temperature range where such adhesives are utilized. In another embodiment, the invention relates to the use of such adhesive composition to bond substrates together.

BACKGROUND OF INVENTION

Polyurethane adhesives are utilized to bond various types of substrates together, for example, glass, plastic, fiber reinforced plastic and metals which may be coated or uncoated, see U.S. Pat. No. 5,719,252 and U.S. Pat. No. 5,143,996. In the automobile industry two part polyurethane adhesives are used to bond tail gates, roof modules, spoilers and trim parts. It is desirable that the stiffness of the adhesive after cure remains relatively constant across the use temperature of the structure bonded together. Stiffness of a polymeric material can be measured by determining the G-modulus, which is measured according to DIN EN 6721-2. For automobiles such use temperature ranges from about –30° C. to about 100° C. over long term exposures and for short term exposure up to about 180° C. Many cured polyurethane adhesive compositions exhibit a glass transition in such temperature range. When a material goes through a glass transition the stiffness and G-modulus are negatively affected. In certain applications any reduction of stiffness negatively impacts the ability of the assembled structure to remain bonded.

In the assembly of parts in industry time is crucial and the curing speed of adhesives is an important parameter. Further, for many substrates a primer is required for an adhesive to bond to a surface which adds steps and cost to the assembly of structures. Thus, adhesives that can bond to certain substrates without the need for a primer are desired.

What is needed is a two part polyurethane which exhibits a low change in stiffness, G-modulus, over the anticipated use temperature which cures rapidly, and bonds well to substrates without the need for a primer.

SUMMARY OF INVENTION

The invention is a two part composition comprising:
A. an isocyanate functional group containing component comprising one or more polyisocyanates and one or more isocyanate functional group containing prepolymers having in its backbone the residue of one or more chains derived from polypropylene oxide, copolymers of ethylene oxide and propylene oxide or mixtures thereof wherein equivalent weight of the chains are predominantly about 780 or greater;
B. an isocyanate reactive component comprising one or more polypropylene oxides, copolymers of ethylene oxide and propylene oxide or mixtures thereof having equivalent weights predominantly about 960 or greater and terminal groups which are reactive with isocyanate groups;
C. one or more low molecular weight compounds having two or more isocyanate reactive groups and a molecular weight of 120 or less wherein the low molecular weight compounds are present as a residue in the isocyanate functional group containing prepolymer, as a component of the isocyanate reactive component or both; and
D. one or more catalysts for the reaction of isocyanate functional groups with isocyanate reactive groups wherein the catalyst may be located in the isocyanate functional group containing component or the isocyanate reactive component.

A two part composition comprising:
A. an isocyanate functional group containing component comprising one or more polyisocyanates and one or more isocyanate functional group containing prepolymers having in its backbone the residue of chains of one or more polypropylene oxides, copolymers of ethylene oxide and propylene oxide or mixtures thereof wherein the chains are predominantly 15 monomer units or greater;
B. an isocyanate reactive component comprising one or more polypropylene oxides, copolymers of ethylene oxide and propylene oxide or mixtures thereof wherein the chains of polypropylene oxide and copolymers of ethylene oxide and propylene oxide contain predominantly 20 monomer units or greater and terminal units which are reactive with isocyanate groups;
C. one or more low molecular weight compounds having two or more isocyanate reactive groups and a molecular weight of 120 or less wherein the low molecular weight compounds are present as a residue in the isocyanate functional group containing prepolymer, as a component of the isocyanate reactive component or both;
D. one or more catalysts for the reaction of isocyanate functional groups with isocyanate reactive groups wherein the catalyst may be located in the isocyanate functional group containing component or the isocyanate reactive component.

In a preferred embodiment, the catalyst comprises one or more diazabicycloalkanes or one or more diazabicyclo alkene salts and preferably one or more of each.

In another embodiment, the invention is a method of bonding two or more substrates together comprising:
i) contacting the isocyanate functional component, Part A, and the isocyanate reactive component, Part B, of the composition of the invention described herein;
ii) contacting the mixture of step i) with one or more substrates;
iii) contacting the substrates together with the mixture of step i) disposed between the substrates;
iv) allowing the mixture of step i) to cure so as to bond the substrates together.

The compositions of the invention exhibit a low variation of stiffness as measured by G-modulus over the use temperature of many structures, preferably over sustained use temperatures of about –30° C. to about 100° C. and over short period, i.e., less than one hour, of up to 180° C. The compositions of the invention cure at ambient temperatures, of about 10° C. to about 40° C. Further, the compositions of the invention demonstrate primeness adhesion to certain substrates such as sheet molding compound (SMC), reaction injection molded parts (typically polyurethane parts) and electrocoated metals (such as steel), and the like. The compositions of the invention can be used to assemble automotive parts, and industrial plastic parts. In preferred embodiments, the two parts of the composition of the invention can be combined in about a 1:1 volumetric ratio.

DETAILED DESCRIPTION OF INVENTION

Figure 1:
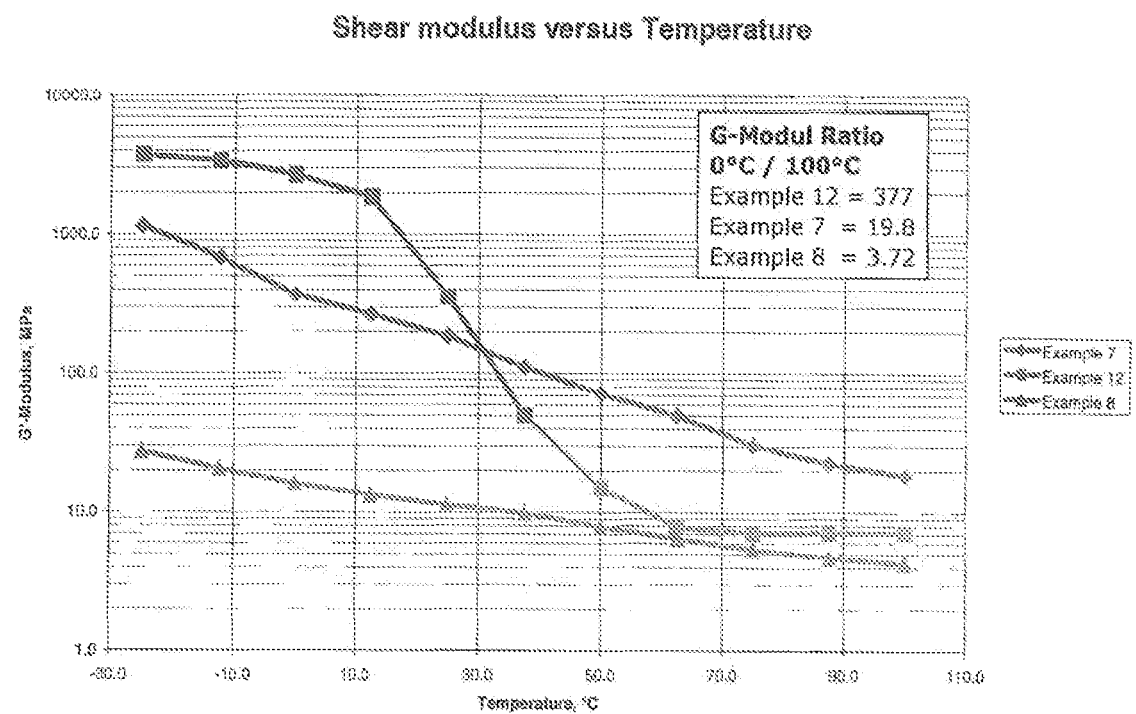
FIG. 1 is a graph of the Shear Modulus of Examples 7, 8 and 12 against temperature.

The invention relates to a two part reactive composition. The two parts are reactive with one another and when contacted have adhesive properties and undergo a curing reaction wherein the composition is capable of bonding substrates together. One part of the composition comprises, or contains, an isocyanate functional component. An isocyanate functional component contains one or more compounds containing isocyanate groups and one or more oligomers and/or prepolymers based on polypropylene oxide, copolymers of ethylene oxide and propylene oxide or mixtures thereof having isocyanate groups. This component can be referred to as the resin side or part. The other component of the composition is an isocyanate reactive component which comprises, or contains, one or more compounds, oligomers or prepolymers based on polypropylene oxide, copolymers of ethylene oxide and propylene oxide or mixtures thereof, which contain groups which are reactive with isocyanate groups. The isocyanate reactive component is often referred to as the curative component. The reaction product is a cured product which is capable of bonding certain substrates together.

Preferable polyisocyanates for use in this invention include aliphatic, cycloaliphatic, araliphatic, heterocyclic or aromatic polyisocyanates, or mixtures thereof. Preferably, the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionalities may also be used, but may cause excessive crosslinking, and result in a composition which is too viscous to handle and apply easily, and can cause the cured composition to be too brittle. Preferably, the equivalent weight of the polyisocyanate is at least about 100, more preferably at least about 110, and is most preferably at least about 120; and is preferably no greater than about 300, more preferably no greater than about 250, and is most preferably no greater than about 200. Preferably, the isocyanate used is an aromatic isocyanate.

Examples of useful polyisocyanates include ethylene diisocyanate, isophorone diisocyanate, bis(4-isocyanate cyclohexyl) methane, trimethyl hexamethylene diisocyanate, 1,4-tetramethylene diisocyanate, 1,6-hexamethylene diisocyanate, 1,12-dodecane diisocyanate, cyclobutane-1,3-diisocyanate, cyclohexane 1,3- and 1,4-di-isocyanate and mixtures of these isomers; 1-isocyanato 3,3,5-trimethyl 5-isocyanato methyl cyclohexane (see e.g., German Auslegeschrift No. 1,202,785); 2,4- and 2,6-hexahydrotolylene diisocyanate and mixtures of these isomers, hexahydro 1,3- and/or 1,4-phenylene diisocyanate, perhydro 2,5'- and/or 4,4'-diphenyl methane diisocyanate, 1,3- and 1,4-phenylene diisocyanate, 2,4'- and 2,6-tolylene diisocyanate and mixtures of these isomers, diphenylmethane 2,4'- and/or 4,4'-diisocyanate, naphthylene 1,5-diisocyanate, triphenylmethane 4,4',4"-triisocyanate, tetramethylxylene diisocyanates, polymeric derivatives of the previously described isocyanates, polyphenyl polymethylene polyisocyanates of the type obtained by condensing aniline with formaldehyde, followed by phosgenation and such as described, for example, in British Patents 874,430 and 848,671, perchlorinated aryl polyisocyanates of the type described in German Auslegeschrift 1,157, 601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789, 1,222,067 and 1,027, 394 and in German Offenlegungsschrift 1,929,034 and 2,004, 048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567, 763 and in German Patent 1,231,688 and reaction products of the aforementioned isocyanates with acetals as described in German Patent 1,072,385. More preferred polyisocyanates include diphenylmethane-4,4'-diisocyanate and polymeric derivatives thereof, isophorone diisocyanate, tetramethylxylene diisocyanate, 1,6-hexamethylene diisocyanate and polymeric derivatives thereof, bis(4-isocyanato-cylohexyl)methane, and trimethyl hexamethylene diisocyanate. Most preferably the polyisocyanate is diphenyl methane diisocyanate (commonly referred to as MDI) or polymeric derivatives thereof.

In a preferred embodiment, the prepolymers having in their backbone the residue of one or more chains of one or more polypropylene oxide, copolymers of ethylene oxide and propylene oxide or mixtures thereof which have chain lengths such that the glass transition temperature of the cured polymers containing such prepolymers exhibit a glass transition temperature of about −40° C. or less, more preferably about −45° C. or less and most preferably about −50° C. or less. The isocyanate containing component comprises the reaction product of an excess on an equivalents basis of one or more polyisocyanates with one or more polypropylene oxides, copolymers of ethylene oxide and propylene oxide or mixtures thereof. Preferably, the isocyanate functional group containing component comprises one or more isocyanate functional group containing prepolymers having in their backbones the residue of one or more chains of one or more polypropylene oxides, copolymers of ethylene oxide and propylene oxide or mixtures thereof which chains have equivalent weights of about 780 or greater, more preferably about 960 or greater, even more preferably about 1,000 or greater and most preferably about 1,500 or greater. Preferably, the isocyanate functional group containing component comprises one or more isocyanate functional group containing prepolymers having in their backbone the residue of one or more chains of one or more polypropylene oxides, copolymers of ethylene oxide and propylene oxide or mixtures thereof which chains have equivalent weights of about 4,000 or less, more preferably about 3,000 or less and most preferably about 2,000 or less. Preferably, the resulting reaction product comprises one or more isocyanate functional group containing prepolymers having in its backbone the residue of one or more chains of one or more polypropylene oxides, copolymers of ethylene oxide and propylene oxide or mixtures thereof wherein the chains exhibit an equivalent weight of predominantly about 780 or greater, more preferably about 960 or greater, even more preferably about 1,000 or greater and most preferably about 1,500 or greater. Preferably, the resulting reaction product comprises one or more isocyanate functional group containing prepolymers having in its backbone the residue of one or more chains of one or more polypropylene oxides, copolymers of ethylene oxide and propylene oxide or mixtures thereof wherein the chains exhibit an equivalent weight predominantly of about 4,000 or less, more preferably about 3,000 or less and most preferably 2,000 or less. "Predominantly" means that the great majority of the chains of the one or more polypropylene oxides, copolymers of ethylene oxide and propylene oxide or mixtures thereof have equivalent weights as recited. More preferably, substantially all of the chains of the residue of the one or more polypropylene oxides, copolymers of ethylene oxide and propylene oxide or mixtures thereof exhibit equivalent weights as described. "Substantially all" means that there may be a minor amount of the polymer chains which do not meet the equivalent weight limitations but such minor amount does not have any impact on the properties of the cured composition of the invention. "Substantially all and consists essentially of" are used in an equivalent manner. In another preferred embodiment, the isocyanate functional group containing prepolymers consists of one or more prepolymers having in their backbone chains of one or more polypropylene oxides, copolymers of ethylene oxide and propylene oxide or mixtures thereof wherein the chains exhibit an equivalent weight as recited. "Consists of" means that the resulting isocyanate functional prepolymers contain polypropylene oxides, copolymers of ethylene oxide and propylene oxide or mixtures thereof wherein all of the chains exhibit equivalent weights as recited.

"Chains" as used herein with respect to propylene oxides and copolymers of propylene oxides and ethylene oxide refers to polymer segments of only propylene oxide or propylene oxide and ethylene oxides. "Chains" as used in this context does not include the initiators. Thus, the weights and number of monomer units referred to herein relative to chains of propylene oxide or propylene oxide and ethylene oxide are quoted on an equivalents basis.

In a preferred embodiment, the isocyanate group containing prepolymer does not contain chains of polypropylene oxide or copolymers of ethylene oxide and propylene oxide having equivalent weights of less than about 780, more preferably less than about 960, even more preferably less than about 1,000 and most preferably less than about 1,500. In a preferred embodiment, the isocyanate functional group containing component does not contain prepolymers having in its backbone chains of polypropylene oxides, copolymers of ethylene oxide and propylene oxide having equivalent weights of greater than about 4,000, more preferably about greater than about 3,000 or greater and most preferably greater than about 2,000 or greater.

In another embodiment, the isocyanate group containing prepolymers contain the residue of one or more polypropylene oxides, copolymers of ethylene oxide and propylene oxide or mixtures thereof wherein the chains of polypropylene oxides, copolymers of ethylene oxide, propylene oxide and mixtures thereof contain a sufficient number of monomer units such that the glass transition temperature of the cured polymer chains containing such prepolymers exhibit a glass transition temperature of about −40° C. or less, more preferably about −45° C. or less and most preferably about −50° C. or less. The isocyanate group containing prepolymers comprise one or more isocyanate functional group containing prepolymers having in its backbone the residue of one or more polypropylene oxides, copolymers of ethylene oxide and propylene oxide or mixtures thereof wherein the chains of polypropylene oxides, copolymers of ethylene oxide and propylene oxide or mixtures thereof are predominantly greater than about 15 monomer units. "Polyoxyalkylene chains" as used herein mean chains containing polypropylene oxide units, units of copolymers of ethylene oxide and propylene oxide or a mixture thereof. "Predominantly about 15 monomer units or greater" means that the great majority of the chains of the one or more polypropylene oxides, copolymers of ethylene oxide and propylene oxide or mixtures thereof have than about 15 monomer units or greater. More preferably, the one or more isocyanate functional group containing prepolymers have in its backbone the residue of one or more polypropylene oxides, copolymers of ethylene oxide and propylene oxide or a mixture thereof wherein substantially all of the chains of polypropylene oxides, copolymers of ethylene oxide and propylene oxide or mixtures thereof are than about 15 monomer units or greater. Substantially all of the one or more polypropylene oxides, copolymers of ethylene oxide and propylene oxide or mixtures thereof chains being greater than about 15 monomer units means that there may be a minor amount of chains with less than about 15 monomer units but such minor amount does not have any impact on the properties of the cured composition of the invention. In another preferred embodiment, the isocyanate functional group containing prepolymers having in its backbone the residue of one or more polypropylene oxides, copolymers of ethylene oxide and propylene oxide or mixtures thereof consists of chains of polypropylene oxides, copolymers of ethylene oxide and propylene oxide having 15 monomer units per chain or greater. "Consists of" means that the resulting isocyanate functional component contains only chains of polypropylene oxides, copolymers of ethylene oxide and propylene oxide or mixtures thereof having 15 monomer units per chain or greater. More preferably, the number of monomer units per chain in the polypropylene oxides, copolymers of ethylene oxide and propylene oxide chains, or mixtures thereof is about 20 monomer units or greater and most preferably 30 monomer units or greater. More preferably, the number of monomer units per chain in the chains of polypropylene oxides, copolymers of ethylene oxide and propylene oxide or mixture thereof is about 120 or less and most preferably about 60 monomer units or less. In one preferred embodiment, the isocyanate containing component does not contain a chain of polypropylene oxide or copolymers of ethylene oxide and propylene oxide having less than about 15 monomer units, more preferably less than about 20 monomer units and most preferably less than about 30 monomer units. In a preferred embodiment, the isocyanate containing component does not contain a chain of polypropylene oxide copolymers of ethylene oxide and propylene oxide having greater than about 120 monomer units per chain and most preferably greater than about 60 monomer units per chain.

The isocyanate functional prepolymers for use in the composition preferably exhibit an average isocyanate functionality of at least about 2.0 and a molecular weight of at least about 2,000. Preferably, the average isocyanate functionality of the prepolymer is at least about 2.0, and is more preferably at least about 2.2. Preferably, the isocyanate functionality is no greater than about 4.0, more preferably, no greater than about 3.5 and most preferably, no greater than about 3.0. Preferably, the weight average molecular weight of the prepolymer is at least about 2,500, and is more preferably at least about 3,000; and is preferably no greater than about 40,000, even more preferably, no greater than about 20,000, more preferably, no greater than about 15,000, and is most preferably, no greater than about 10,000. The prepolymer may be prepared by any suitable method, such as by reacting the polypropylene oxides, copolymers of ethylene oxide and propylene oxide or a mixture thereof containing at least two isocyanate-reactive groups with an excess over stoichiometry of a polyisocyanate under reaction conditions sufficient to form the corresponding prepolymer. The prepolymer may be prepared by any suitable method, such as bulk polymerization and solution polymerization. The reaction to prepare the prepolymer is carried out under anhydrous conditions, preferably under an inert atmosphere, such as a nitrogen blanket, to prevent cross-linking of the isocyanate groups by atmospheric moisture. The reaction is catalyzed by a catalyst for the reaction of isocyanate groups with isocyanate reactive groups. Examples of such include the stannous salts of carboxylic acids, such as stannous octoate, stannous oleate, stannous acetate, and stannous laurate; dialkyltin dicarboxylates, such as dibutyltin dilaurate and dibutyltin diacetate, tertiary amines and tin mercaptides. Preferably, the reaction to prepare the prepolymer is catalyzed by stannous octoate. The amount of catalyst employed is generally between about 0.005 and about 5 percent by weight of the mixture catalyzed, depending on the nature of the isocyanate. The reaction is preferably carried out at a temperature between about 0° C. and about 150° C., more preferably between about 25° C. and about 80° C., until the residual isocyanate content determined by titration of a sample is very close to the desired theoretical value. The isocyanate content in the prepolymers is preferably in the range of about 6 percent to about 35 percent by weight, more preferably in the range of about 8 percent to about 30 percent by weight and most preferably in the range of about 10 percent to about 25 percent by weight.

The isocyanate group containing component is present in the composition of the invention in a sufficient amount to form a cured component when combined with the isocyanate reactive compound which is capable of bonding substrates together in a manner that the substrates remain bound together when exposed to temperatures of about −30° C. to about 100° C. for long periods of time, such as 10 years; and up to temperatures of about 180° C. for short periods of up to about 30 minutes, preferably up to about 1 hour. Preferably, one or more polyisocyanates and one or more isocyanate functional group containing prepolymers having in its backbone the residue of one or more polypropylene oxide chains, copolymers of ethylene oxide and propylene oxide or mixtures thereof is present in the composition of the invention in an amount of about 20 percent by weight or greater, more preferably about 30 percent by weight or greater and most preferably about 40 percent by weight or greater. Preferably, the one or more polyisocyanates and one or more isocyanate functional group containing prepolymers having in its backbone the residue of one or more polypropylene oxide chains, copolymers of ethylene oxide and propylene oxide or mixtures thereof is present in the composition of the invention in an amount of about 80 percent by weight or less, more preferably about 70 percent by weight or less and most preferably about 60 percent by weight or less.

The isocyanate reactive component comprises one or more polypropylene oxides, copolymers of ethylene oxide and propylene oxide or mixtures thereof wherein such polypropylene oxides, copolymers of ethylene oxide and propylene oxide or mixtures thereof have isocyanate reactive groups. "Isocyanate reactive group" means any functional group or moiety which reacts with an isocyanate group or moiety and is preferably an active hydrogen containing group. In a preferred embodiment, the one or more polypropylene oxides, copolymers of ethylene oxide and propylene oxide or mixtures thereof have a chain length such that the glass transition temperature of the cured polymer chains containing such one or more polypropylene oxides, copolymers of ethylene oxide and propylene oxide or mixtures thereof exhibit a glass transition temperature of about −40° C. or less, more preferably about −45° C. or less and most preferably about −50° C. or less. Preferably, the equivalent weight of the one of more polypropylene oxides, copolymers of ethylene oxide and propylene oxide or mixtures thereof contained in the isocyanate reactive component is about 780 or greater, more preferably about 960 or greater, even more preferably about 1,000 or greater and most preferably about 1,500 or greater. Preferably, the equivalent weight of the one or more polypropylene oxides, copolymers of ethylene oxide and propylene oxide or mixtures thereof contained in the isocyanate reactive component exhibits an equivalent weight of about 4,000 or less, more preferably about 3,000 or less and most preferably about 2,000 or less. Preferably, the one or more polypropylene oxides, copolymers of ethylene oxide and propylene oxide or mixtures thereof contained in the isocyanate reactive component exhibits equivalent weights predominantly about 780 or greater, more preferably about 960 or greater, even more preferably about 1,000 or greater and most preferably about 1,500 or greater. Preferably, polypropylene oxides, copolymers of ethylene oxide and propylene oxide or mixtures thereof contained in the isocyanate reactive component exhibit equivalent weights predominantly of about 4,000 or less, more preferably about 3,000 or less and most preferably about 2,000 or less. "Predominantly" means that the great majority of the one or more polypropylene oxides, copolymers of ethylene oxide and propylene oxide or mixtures thereof have equivalent weights as recited. More preferably, substantially all of the one or more polypropylene oxides, copolymers of ethylene oxide and propylene oxide or mixtures thereof exhibit equivalent weights as described. "Substantially all" means that there may be a minor amount of the polymer chains which do not meet such equivalent weight limitations but such minor amount does not have any impact on the properties of the cured composition of the invention. In another preferred embodiment, the isocyanate reactive group containing component contains one or more polypropylene oxides, copolymers of ethylene oxide and propylene oxide or mixtures thereof which consists of the equivalent weights as recited. "Consists of" means that the isocyanate reactive component contains only of one or more polypropylene oxides, copolymers of ethylene oxide and propylene oxide or mixtures thereof which exhibit equivalent weights as recited.

In another embodiment, the isocyanate reactive component contains one or more polypropylene oxides, copolymers of ethylene oxide and propylene oxide or mixtures thereof wherein the number of monomer units are such that resulting cured composition of the invention exhibits a glass transition temperature of about −40° C. or less, more preferably about −45° C. or less and most preferably about −50° C. or less. Preferably, the isocyanate reactive component comprise one or more polypropylene oxides, copolymers of ethylene oxide and propylene oxide or mixtures thereof which are predominantly 20 monomer units or greater and terminal units on the one or more polypropylene oxides, copolymers of ethylene oxide and propylene oxide or mixtures thereof which are reactive with isocyanate groups. "Predominantly greater than about 20 monomer units" means that the great majority of the polyoxyalkylene units have greater than about 20 units. More preferably, the polypropylene oxides, copolymers of ethylene oxide and propylene oxide or mixtures thereof of the isocyanate reactive component contain substantially all of the polypropylene oxides, copolymers of ethylene oxide and propylene oxide or mixtures thereof having chains of about 20 monomer units or greater. "Substantially all of the chains of polypropylene oxides, copolymers of ethylene oxide and propylene oxide or mixtures thereof being about 20 monomer units or greater" means that the there may be a minor amount of units less than about 20, but such minor amount does not have any impact on the properties of the cured composition of the invention. In another preferred embodiment, the one or more polypropylene oxides, copolymers of ethylene oxide and propylene oxide or mixtures thereof of the isocyanate reactive component contains chains of polypropylene oxides, copolymers of ethylene oxide and propylene oxide or mixtures thereof which consists of greater than 20 monomer units or greater. "Consists of" means that the one or more polypropylene oxides, copolymers of ethylene oxide and propylene oxide or mixtures thereof of the resulting isocyanate functional component contains only chains having 20 monomer units per chain or greater. More preferably, the number of monomer units per chain in the one or more polypropylene oxides, copolymers of ethylene oxide and propylene oxide or mixtures thereof of the isocyanate reactive compound is about 25 monomer units or greater and most preferably about 30 monomer units or greater. More preferably, the number of monomer units per chain in the chains of the one or more polypropylene oxides, copolymers of ethylene oxide and propylene oxide or mixtures thereof of the isocyanate reactive component is about 70 monomer units or less and most preferably about 50 monomer units or less. In one preferred embodiment, the isocyanate reactive containing component does not contain chains of polypropylene oxides, copolymers of ethylene oxide and propylene oxide or mixtures thereof having less than about 20 monomer units and more preferably less than about 25 monomer units and most preferably less than about 30 monomer units. In one preferred embodiment, the isocyanate reactive group containing component does not contain chains of polypropylene oxides, copolymers of ethylene oxide and propylene oxide or mixtures thereof having greater than about 70 monomer units, and more preferably does not contain chains having greater than about 50 monomer units.

The term "isocyanate-reactive group" as used herein includes any group or moiety containing an active hydrogen group or moiety, or an imino functional compound. For the purposes of this invention, an active hydrogen containing group refers to a group containing a hydrogen atom which, because of its position in the molecule, displays significant activity according to the Zerewitnoff test described by Wohler in the Journal of the American Chemical Society, Vol. 49, page 3181 (1927). Illustrative of such active hydrogen groups are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate-reactive group is a hydroxyl or primary amine, and is more preferably a hydroxyl.

An alkyleneoxy unit comprises an alkylene unit bonded to an oxygen. Preferably, the alkylene unit comprises ethylene or propylene. The term "monomer units" as used with respect to polypropylene oxides and copolymers of ethylene oxide and propylene oxide mean alkyleneoxy units. In general, polypropylene oxides, copolymers of ethylene oxide and propylene oxide or mixtures thereof may be prepared by polymerizing propylene oxide, a mixture of propylene oxide and ethylene oxide, or propylene oxide and ethylene oxide sequentially in the presence of an active hydrogen-containing initiator compound containing two or more active hydrogen groups such as water, ammonia, a polyalcohol, or an amine. Such methods are described, for example, in U.S. Pat. Nos. 4,269,945; 4,218,543; and 4,374,210; which are hereby incorporated by reference in their entirety. Copolymers of ethylene oxide and propylene oxide can be arranged in a random manner or in blocks of each monomer. For block copolymers, the ethylene oxide and propylene oxide monomers are reacted in the desired sequence. For random polymers, the ethylene oxide and propylene oxide monomers are reacted at the same time. A preferred class of copolymers of ethylene oxide and propylene oxide are ethylene oxide capped polypropylene oxides, which are block copolymers. For ethylene oxide capped polypropylene oxides, a polypropylene oxide chain is prepared as described and then on the terminal ends of the polypropylene oxide chain is polymerized the desired number of ethylene oxide units. In a preferred embodiment, the copolymers of ethylene oxide and propylene oxide contain about 40 weight percent or less of ethylene oxide monomer units, even more preferably 25 weight percent or less of ethylene oxide monomer units, even more preferably about 15 weight percent or less of ethylene oxide monomer units and most preferably about 12 weight percent or less of ethylene oxide monomer units. In a preferred embodiment, where ethylene monomer units are present, they are present in an amount of 5 percent by weight or greater and more preferably about 8 percent by weight or greater. Most preferred, however, are ethylene oxide-capped polypropylene oxide polyols prepared by reacting glycerin with propylene oxide, followed by reacting the resulting product with ethylene oxide. Preferable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

The one or more are present in the composition of the invention in a sufficient amount to form a cured component when combined with the isocyanate containing component which is capable of bonding substrates together in a manner that the substrates remain bound together when exposed to temperatures of about −30° C. to about 100° C. for long periods of time, such as 10 years; and up to temperatures of about 180° C. for short periods of up to 30 minutes. Preferably, the one or more polypropylene oxides, copolymers of ethylene oxide and propylene oxide or mixtures thereof are present in the composition of the invention in an amount of about 20 percent by weight or greater, more preferably about 30 percent by weight or greater and most preferably about 40 percent by weight or greater. Preferably, the one or more polypropylene oxides, copolymers of ethylene oxide and propylene oxide or mixtures thereof is present in the composition of the invention in an amount of about 70 percent by weight or less, more preferably about 60 percent by weight or less and most preferably about 50 percent by weight or less.

The composition of the invention further comprises one or more catalysts for the reaction of isocyanate functional groups with isocyanate reactive groups wherein the catalyst may be located in the isocyanate functional group containing component or the isocyanate reactive component. Preferably, the catalyst is located in the isocyanate reactive component to improve the stability of the two component system. The catalyst can be any catalyst known to the skilled artisan for the reaction of isocyanate groups with active hydrogen containing compounds. Among preferred catalysts are organotin compounds, metal alkanoates, tertiary amines and diazabicyclo compounds. The catalyst is utilized in a sufficient amount to cause the isocyanate groups to react with the isocyanate reactive groups at a reasonable rate. The amount of catalyst utilized depends on the choice of catalyst and the reaction rate desired. Preferably, the catalyst will be utilized in an amount of about 0.006 percent by weight or greater based on the composition of the invention, more preferably about 0.01 percent by weight or greater and most preferably about 0.02 percent by weight or greater. Preferably, the catalyst will be utilized in an amount of about 5.0 percent by weight or less based on the composition of the invention, more preferably about 2.0 percent by weight or less and most preferably about 1.0 percent by weight or less. Included in the useful organotin catalysts are compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^1OC(O))_2$—Sn—$(R^1)_2$ wherein $R^1$ is independently in each occurrence a $C_{1-10}$ alkyl, preferably a $C_{1-3}$ alkyl and most preferably a methyl. Dialkyltin dicarboxylates with lower total carbon atoms are preferred as they are more active catalysts in the compositions used in the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organotin or metal alkanoate catalyst is preferably present in an amount of about 0.006 percent or greater based on the weight of the compositions and more preferably 0.012 percent or greater. The organotin or metal alkanoate catalyst is preferably present in an amount of about 1.0 parts by weight or less based on the weight of the composition, more preferably about 0.5 percent by weight or less and most preferably about 0.1 percent by weight or less. Among preferred tertiary amines are dimorpholinodialkyl ether, a di((dialkylmorpholino)alkyl) ether, bis-(2-dimethylaminoethyl) ether, triethylene diamine, pentamethyldiethylene triamine, N,N-dimethylcyclohexylamine, N,N-dimethyl piperazine, 4-methoxyethyl morpholine, N-methylmorpholine, N-ethyl morpholine, and mixtures thereof. More preferred tertiary amines include dimorpholinodiethyl ether or (di-(2-(3,5-dimethyl-morpholino)ethyl)ether). Tertiary amines are preferably employed in an amount, based on the weight of the composition, of about 0.01 percent by weight or greater based on the composition of the invention, more preferably about 0.05 percent by weight or greater, even more preferably about 0.1 percent by weight or greater and most preferably about 0.2 percent by weight or greater and preferably about 2.0 percent by weight or less, more preferably about 1.75 percent by weight or less, even more preferably about 1.0 percent by weight or less and most preferably about 0.4 percent by weight or less.

Diazabicyclo compounds are compounds which have diazobicyclo structures. Among preferred diazabicyclo hydrocarbons include diazabicycloalkanes and diazabicyclo alkene salts. Preferably, the catalyst comprises one or more diazabicycloalkanes and one or more diazabicyclo alkene salts. Where both classes of compounds are present, the mole ratio of the one or more diazabicycloalkanes to the one or more diazabicycloalkene salts is preferably about 1:9 or greater; more preferably about 2:8 or greater; and most preferably about 4:6 or greater. Where both classes of compounds are present, the mole ratio of the one or more diazabicycloalkanes to the one or more diazabicycloalkene salts is about 9:1 or less; more preferably about 8:2 or less; and most preferably about 6:4 or less. Preferred diazabicycloalkanes include diazabicyclooctane, available from Air Products under the trademark and designations, Dabco, Dabco WT, Dabco DC 1, Dabco DC 2, and Dabco DC 21. Preferred diazabicycloalkene salts include diazabicycloundecene in the phenolate, ethylhexoate, oleate and formiate salt forms, available from Air Products under the trademark and designations, Polycat SA 1, Polycat SA 1/10, Polycat SA 102 and Polycat SA 610. In a preferred embodiment one or more diazabicyclo compounds and one or more organometallic and/or tertiary amine catalysts are present in the composition of the invention. The diazabicyclo compounds are present in a sufficient amount such that the two part compositions when contacted exhibit an acceptable cure rate as defined herein. The diazabicyclo compounds preferably are present in the compositions of the invention an amount of about 0.01 percent by weight or greater, more preferably about 0.02 percent by weight or greater. Preferably, the diazabicyclo compounds are present in the compositions of the invention in an amount of about 5 percent by weight or less, more preferably about 1 percent by weight or less and most preferably about 0.5 percent by weight or less.

The composition of the invention further comprise one or more low molecular weight compounds having two or more isocyanate reactive groups and a hydrocarbon backbone wherein the backbone may further comprise one or more heteroatoms. Such low molecular weight compounds may be compounds known in the art as chain extenders, such compounds are difunctional. Such low molecular weight compounds may be compounds also known in the art as crosslinkers, such compounds have, on average, greater than two active hydrogen groups per compound. The heteroatoms in the backbone can be oxygen, sulfur, nitrogen or a mixture thereof, wherein oxygen, nitrogen or a mixture thereof is more preferred and oxygen is most preferred. Preferably, the molecular weight of the low molecular weight compound is about 120 or less and more preferably about 100 or less. Preferably, the low molecular weight compound comprises one or more multifunctional alcohols, multifunctional alkanol amines, one or more adducts of multifunctional alcohol and an alkylene oxide, one or more adducts of a multifunctional alkanol amine and an alkylene oxide or a mixture thereof. Preferred low molecular weight compounds comprise linear hydrocarbon backbones. Preferred low molecular weight compounds are straight chain hydrocarbons which may contain one or more heteroatoms in the backbone. More preferred low molecular weight compounds contain an even number of carbon atoms. Among preferred multifunctional alcohols and multifunctional alkanol amines are ethane diol, propane diol, butane diol, hexane diol, heptane diol, octane diol, glycerine, trimethylol propane, pentaerythritol, neopentyl glycol, ethanol amines and propanol amines. Among preferred adducts containing alkylene oxides are adducts of alcohols having 3 or more hydroxyl groups and ethylene oxide or propylene oxide units with less than 1.5 alkylene oxide units per hydroxyl on average. More preferred low molecular weight compounds include ethane diol, propane diol, butane diol, hexane diol, octane diol, glycerine, trimethylol propane, diethanol amine, triethanol amine, di-isopropanol amine, tri-isopropanol amine and the like. The most preferred low molecular weight compound are straight chained diols having an even number of carbons, such as ethane diol, 1,4 butane diol, 1,6 hexane diol and the like. Blends of various low molecular weight compounds may be used. The low molecular weight compound is used in a sufficient amount to obtain the desired G-Modulus (E-Modulus). The low molecular compound may be located in the resin side, the curative side or both. Preferably, the low molecular weight compound is located in the curative side. The amount of the low molecular weight compound used is interdependent with the amount of the residue of polypropylene oxides, copolymers of ethylene oxide and propylene oxide or mixtures thereof located in the isocyanate containing component and the amount of polypropylene oxides, copolymers of ethylene oxide and propylene oxide or mixtures thereof located in the isocyanate reactive component. The low molecular weight compound is present to raise the G-Modulus of the cured adhesive while the residue of the polypropylene oxides, copolymers of ethylene oxide and propylene oxide or mixtures thereof located in the cured polymer tends to lower the G-Modulus. Preferably, the low molecular weight compound is present in the composition of the invention in an amount of about 2 percent by weight or greater, more preferably about 2.5 percent by weight or greater and most preferably about 3.0 percent by weight or greater. Preferably, the low molecular weight compound is present in the composition of the invention in an amount of about 10 percent by weight or less, more preferably about 8 percent by weight or less and most preferably about 6 percent by weight or less. The low molecular weight compound preferably has 1.5 alkylene oxide monomer units or less per active hydrogen atom.

The choice of the low molecular weight compound polypropylene oxides, copolymers of ethylene oxide and propylene oxide or mixtures thereof utilized in the isocyanate reactive component and the isocyanate containing component are interdependent. To achieve the desired Tg and G-Modulus of the cured composition, the amount and the nature of the low molecular weight compound and the polypropylene oxides, copolymers of ethylene oxide and propylene oxide or mixtures thereof utilized in the isocyanate reactive component and the isocyanate containing component are important. By careful selection of the two classes of components, the desired properties in the cured composition can be achieved. It is desired that the two classes of components be chosen so that in the uncured state the materials are miscible in one another and that once cured they form separate solid phases. If the polypropylene oxide molecular weight is too high the presence of ethylene oxide is desired to introduce the desired affinity to the low molecular weight compound. If too much ethylene oxide is used, the materials have too much of an affinity for one another and the low molecular weight compound and the copolymer of ethylene oxide and propylene oxide will not form a separate solid phase upon cure. The relative amounts and location of the low molecular compound and the polypropylene oxides, copolymers of ethylene oxide and propylene oxide or mixtures thereof in the two parts of the composition are preferably adjusted to allow the desired volumetric ratio of the resin and the curative side. In other words, the two components can be located in either part, which allows adjustment of the amount of each in the components to give the desired volumetric ratio of the parts for application. As the polypropylene oxide chain equivalent weights increase, the presence of ethylene oxide units may be required to achieve the desired balance of miscibility of the components in the uncured state and phase separation in the cured state. For propylene oxide based diols, the presence of ethylene oxide may be desirable at equivalent weights above about 1,000. For propylene oxide triols, the presence of ethylene oxide may be desirable at equivalent weights above about 700.

Part B the curative part of the invention may further comprise polyoxyalkylene polyamine having 2 or greater amines per polyamine. Preferably, the polyoxyalkylene polyamine has 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 4,000 or less and most preferably about 3,000 or less. Among preferred polyoxyalkylene polyamines are JEFFAMINE™ D-T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the composition of the invention in an amount of about 0.2 percent by weight or greater, more preferably about 0.25 percent by weight or greater and most preferably about 0.3 percent by weight or greater. Preferably, the polyoxyalkylene polyamine is present in the composition of the invention in an amount of about 4 percent by weight or less, more preferably about 3 percent by weight or less and most preferably about 2 percent by weight or less.

The two parts of the composition of the invention are preferably combined such that the equivalents of isocyanate groups are greater than the equivalents of the isocyanate reactive groups. More preferably, the equivalents ratio of isocyanate groups to equivalents of isocyanate reactive groups is greater than about 1.0:1.0, even more preferably about 1.05:1.0 or greater and most preferably about 1.10:1.0 or greater. More preferably, the equivalents ratio of isocyanate groups to isocyanate reactive groups is about 2.0:1.0 or less, and most preferably about 1.40:1.0 or less.

Either or both of Part A, the resin part and part B, the curative part, may contain plasticizers, fillers, pigments, stabilizers and other additives commonly present in curable polyurethane forming compositions and adhesives. By the addition of such materials, physical properties such as rheology, flow rates and the like can be modified. However, to prevent premature hydrolysis of the moisture sensitive groups of the isocyanate reactive component, fillers should be thoroughly dried before admixture therewith. The compositions of the invention may include ultraviolet stabilizers and antioxidants and the like.

Among optional materials in the curable composition are fillers, such as, clays, alumina, limestone, talc, calcium carbonate and expanded perlites. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably, the clay is admixed in the form of pulverized powder, spray-dried beads or finely ground particles. Clays may be used in an amount of about 0 percent by weight or greater of the composition of the invention, more preferably about 5 percent by weight or greater and even more preferably about 10 percent by weight or greater. Preferably, the clays are used in an amount of about 60 percent by weight or less of the composition of the invention and more preferably about 50 percent by weight or less.

The curable composition of this invention may further comprise plasticizers so as to modify the rheological properties to a desired consistency. Such materials should be free of water, inert to isocyanate groups and compatible with the polymers present. Suitable plasticizers are well known in the art and preferable plasticizers include alkyl phthalates such as diisononylphthalate or diisodecylphthalate, partially hydrogenated terpenes, trioctyl phosphate, toluene-sulfamide, esters of alkylsulfonic acid, adipic acid esters, castor oil, toluene and alkyl naphthalenes. The amount of plasticizer in each part of the curable composition is that amount which gives the desired rheological properties. The amounts disclosed herein include those amounts added during preparation of the isocyanate containing prepolymer and during compounding of the curable composition. Preferably, plasticizers are used in the composition of the invention in an amount of about 0 percent by weight or greater based on the weight of the composition of the invention, more preferably about 5 percent by weight or greater and most preferably about 10 percent by weight or greater. The plasticizer is preferably used in an amount of about 45 percent by weight or less based on the weight of the composition of the invention and more preferably about 40 percent by weight or less.

The composition of this invention may further comprise stabilizers, which function to protect the adhesive composition from moisture, thereby inhibiting advancement and preventing premature crosslinking of the isocyanates in the curable formulation. Stabilizers known to the skilled artisan for polyurethane curable two part compositions may be used herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 percent by weight or greater based on the total weight of the composition of the invention, preferably about 0.5 percent by weight or greater and more preferably about 0.8 percent by weight or greater. Such stabilizers are used in an amount of about 5.0 percent by weight or less based on the weight of the composition of the invention, more preferably about 2.0 percent by weight or less and most preferably about 1.4 percent by weight or less.

The composition of this invention may further comprise an adhesion promoter, such as those disclosed in Mahdi, U.S. Patent Publication 2002/0100550 paragraphs 0055 to 0065 and Hsieh, U.S. Pat. No. 6,015,475 column 5, line 27 to column 6, line 41 incorporated herein by reference. The amounts of such adhesion promoters useful are also disclosed in these references and incorporated herein by reference.

The adhesive composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydrophilic materials are pyrrolidones such as 1 methyl-2-pyrrolidone (or N-methyl pyrrolidone). The hydrophilic material is preferably present in an amount of about 0.1 percent by weight or greater based on the weight of the composition of the invention, more preferably about 0.3 percent by weight or greater, and preferably about 1.0 percent by weight or less and more preferably about 0.6 percent by weight or less. Optionally, the curable composition may further comprise a thixotrope (rheological additive). Such thixotropes are well known to those skilled in the art and include fumed silica, calcium carbonate, carbon black and the like. The thixotrope may be added to the composition in a sufficient amount to give the desired rheological properties. Preferably, the thixotrope is present in an amount of about 0 percent by weight or greater based on the weight of the composition of the invention, preferably about 1 part by weight or greater. Preferably, the optional thixotrope is present in an amount of about 10 percent by weight or less based on the weight of the composition of the invention and more preferably about 2 percent by weight or less.

The parts or the curable composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. It may be advantageous to add plasticizers to the reaction mixture for preparing the isocyanate containing component so that such mixtures may be easily mixed and handled. Alternatively, the plasticizers can be added during blending of all the components. Preferably, the components are blended at a temperature of about 20° C. to about 100° C., more preferably about 25° C. to about 70° C. Preferably, the materials are blended under vacuum or an inert gas, such as nitrogen or argon. The ingredients are blended for a sufficient time to prepare a well blended mixture, preferably from about 10 to about 60 minutes. Once the parts or the curable composition are formulated, they are packaged in a suitable container such that they are protected from atmospheric moisture and oxygen. Contact with atmospheric moisture and oxygen could result in premature crosslinking of the isocyanate containing component.

The polymerizable compositions of the invention can be easily used as two-part adhesives. The components of the polymerizable compositions are blended as would normally be done when working with such materials. For a two-part polymerizable composition, useful as an adhesive, such as those of the invention to be most easily used in commercial and industrial environments, the volume ratio at which the two-parts are combined should be a convenient whole number. This facilitates application of the curable composition with conventional, commercially available dispensers. Such dispensers are shown in U.S. Pat. Nos. 4,538,920 and 5,082,147 (incorporated herein by reference) and are available from Conprotec, Inc. (Salem, N.J.) under the trade name MIXPAC. Typically, these dispensers use a pair of tubular receptacles arranged side-by-side with each tube being intended to receive one of the two-parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two-parts. The blended polymerizable composition is extruded from the mixing chamber onto a substrate. When using electrically-driven equipment, dynamic mixing may be used. Once the tubes have been emptied, they can be replaced with fresh tubes and the application process continued. The volumetric ratio at which the two-parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two-parts of the polymerizable composition at a convenient mix ratio. Some common mix ratios are 1:1, 2:1, 4:1 and 10:1. Preferably, the two parts are blended at a mix ratio of about 1:1.

Preferably, the mixed two-part compositions of the invention have a suitable viscosity to allow application without dripping. Preferably, the viscosities of the two individual components should be of the same order or magnitude. Preferably, the mixed compositions prior to cure have the viscosity of about 5 Pa·S (5,000 centipoises) or greater, more preferably about 10 Pa·S (10,000 centipoises) or greater and most preferably about 20 Pa·S (20,000 centipoises) or greater. Preferably, the mixed two part compositions have a viscosity prior to cure of about 1000 Pa·S (1,000,000 centipoises) or less, more preferably about 700 Pa·S (700,000 centipoises) or less and most preferably about 500 Pa·S (500,000 centipoises) or less.

The polymerizable compositions of the invention are used to bond a variety of substrates together as described hereinbefore. The compositions can be used to bond porous and nonporous substrates together. The polymerizable composition after contacting the two parts together is applied to a first substrate and the polymerizable composition on the first substrate is thereafter contacted with a second substrate. In preferred embodiments, the surfaces to which the composition of the invention is applied are cleaned and optionally activated and/or primed prior to application. Generally, the composition of the invention is applied at temperature at which the polymerizable composition can be pumped. Preferably, the polymerizable composition of the invention is applied at a temperature of about 10° C. or greater for application, more preferably a temperature of about 18° C. or greater. Preferably, the polymerizable composition of the invention is applied at a temperature of about 40° C. or less for application, more preferably a temperature of about 35° C. or less. The polymerizable composition starts to cure upon contacting the two parts. Curing can be accelerated by applying heat to the curing adhesive by means of convection heat, microwave heating and the like. Preferably, the curable composition of the invention is formulated to provide an open time of at least about 3 minutes or greater more preferably about 5 minutes or greater. "Open time" is understood to mean the time after contacting the two parts until the mixture starts to become a high viscous paste and is not subject to deformation during assembly to conform to the shape of the second substrate and to adhere to it.

The composition of the invention is preferably used to bond metal, coated metal (with e-coat or a paint system), plastic, fiber reinforced plastic, wood and/or glass together. In another embodiment, the compositions of the invention can be used to bond modular components to a car body or to each other. Examples of modular components include vehicle modules, such as a door module, window module, roof module or body. The polymerizable compositions of the invention can be also used to bond exterior or interior trim to automobile bodies.

In certain applications, the polymerizable composition of the invention may be utilized with a primer or an activatable wipe. The primer or activatable wipe is typically applied to the surface of one or more of the substrates. Any solvent is allowed to volatilize away and then the polymerizable composition is contacted with the substrates. Preferably, the time period from application of the primer or activatable wipe to application of the polymerizable composition to the substrate is about 0.5 minutes or greater, more preferably about 1 minutes or greater and most preferably about 2 minutes or greater.

The polymerizable composition is capable of bonding to certain substrates in the absence of a primer or of any other treatment of the surface of the substrate, except cleaning of the surface. Substrates which the polymerizable composition bonds to without the need for primer or surface treatment typically include sheet molding compound (SMC), fiber reinforced plastics, such as polyester, and coated metals, e.g. e-coated aluminium and steel and painted metal sheets.

The polymerizable compositions of the invention preferably exhibit adequate green strength to hold substrates together without moving with respect to one another without the application of force to one of the substrates after about 60 minutes, more preferably after about 40 minutes and most preferably after about 20 minutes. The polymerizable compositions of the invention preferably exhibit full cure after about 7 days, more preferably after about 16 hours and most preferably after about 12 hours. The polymerizable composition of the invention preferably exhibits a tensile strength after complete cure of about 8 MPa or greater, more preferably about 10 MPa or greater and most preferably about 15 MPa or greater. The polymerizable composition of the invention preferably exhibits a lap shear strength after complete cure of about 8 MPa or greater, more preferably about 10 MPa or greater and most preferably about 15 MPa or greater, wherein the lap shear strength is determined according to DIN 53283. The polymerizable composition of the invention preferably exhibits a G-modulus after complete cure of about 6 MPa or greater, more preferably about 8 MPa or greater and most preferably about 9 MPa or greater, wherein the G-modulus is determined according to DIN EN 6721-2. The polymerizable composition of the invention preferably exhibits a G-modulus after complete cure of about 1,000 MPa or less, more preferably about 500 MPa or less and most preferably about 350 MPa or less, wherein the G-modulus is determined according to DIN EN 6721-2 The polymerizable composition of the invention preferably exhibits a Young's modulus after complete cure of about 17 MPa or greater, more preferably about 22 MPa or greater and most preferably about 25 MPa or greater, wherein the Young's Modulus is determined according to DIN 53504. The polymerizable composition of the invention preferably exhibits an elongation at break after complete cure of about 80 percent or greater, more preferably about 100 percent or greater and most preferably about 250 percent or greater. The polymerizable composition of the invention preferably exhibits an elongation at break after complete cure of about 500 percent or less, more preferably about 400 percent or less and most preferably about 350 percent or less. Elongation at break is determined according to DIN 53504. The polymerizable composition of the invention preferably exhibits a glass transition temperature after complete cure of about −40° C. or less, more preferably about −45° C. or less and most preferably about −50° C. or less, wherein the glass transition temperature is determined according to DSC, Mettler Toledo TA 821, Scan −65 to 220° C., heating rate 10° C./min.

Molecular weights as described herein are number average molecular weights which may be determined by Gel Permeation Chromatography (also referred to as SEC). For polyurethane prepolymers, it is also possible to calculate approximate number average molecular weight from the equivalent ratio of the isocyanate compounds and of the polyol compounds with which they are reacted as known to the persons skilled in the art. Unless otherwise stated all parts and percentages are by weight and based upon the weight of the composition of the invention.

ILLUSTRATIVE EMBODIMENTS OF THE INVENTION

The following examples are provided to illustrate the invention, but are not intended to limit the scope thereof. All parts and percentages are by weight unless otherwise indicated.

EXAMPLE 1

Preparation of the Polyether Based Isocyanate Containing Pre-Polymer 1

300 g of molten pure 4,4'-Diphenylmethane diisocyanate (MDI) are weighed into a lab reactor at a temperature 50° C., 750 g of a polypropyleneoxide diol MW (molecular weight) 2,000 glycerine initiated propylene oxide having about 16 monomer units and 930 g of an ethylene oxide capped polypropyleneoxide triol (glycerine initiated (2 percent) (86 percent) propylene oxide with about 2 percent ethylene oxide end block, 26 to 30 monomer units) MW 4500 are added and the mixture is catalyzed with 6 g of a 0.5 percent tin-octoate solution in Di-isononyl phthalate. The reactor is kept at 70° C. for 1 hour, then 1014 g di-isononyl phthalate added. The resulting prepolymer exhibits an isocyanate content of 1.5 percent and a weight average molecular weight of approximately 6,500.

EXAMPLE 2

Preparation of the Polyether Based Isocyanate Containing Pre-Polymer 2

1098 g of Polymeric MDI having a an average functionality of 2.7 and 888 g pure carbodiimide modified 4,4'-MDI are weighed into a lab reactor at a temperature 50° C., then 1014 g polypropyleneoxide diol MW 2000 (as described in Example 1) (70° C.) is added. The reactor is kept at 70° C. for 1 hour. The resulting prepolymer exhibits an isocyanate content of 18.5 percent.

EXAMPLE 3

Preparation of Component A1 Resin Part 2130 g of prepolymer 2, 852 g talc, 15 g fumed silica and 3 g color paste are mixed in a planetary blender under vacuum at 60-80° C. for 1 hour. The finished blend is filled into water vapor proof cartridges.

EXAMPLE 4

Preparation of Component B 1 Curative Part 1590 g of an ethylene oxide capped polypropylene oxide triol as described in Example 1, having a molecular weight (MW) of 4500, 90 g polyether glycol tri-amine MW 400, 180 g monoethylene glycol, 486 g talc, 636 g calcined china clay, 15 g POLYCAT™ SA 1/10 catalyst (62 percent of 1,8 diazabicyclo 5,4,0 undecene blocked with phenolic acid) and 3 g DABCO™ 33LV catalyst (33 percent triethylene diamine in dipropylene glycol) are mixed in a planetary blender under vacuum at 30° C. for 1 hour. The finished blend is filled into water vapor proof cartridges.

EXAMPLE 5

Preparation of Component A2 Resin Part 1605 g of pre-polymer 1, 825 g of pure carbodiimide modified 4,4'-MDI and 570 g carbon black are mixed in a planetary blender under vacuum at 40° C. for 1 hour. The finished blend is filled into water vapor proof cartridges.

EXAMPLE 6

Preparation of Component B2 Curative Part 1395 g polyether polyol triol MW 4500 as described in Example 1, 18 g polyether glycol di-amine MW 400, 138 g 1,4-butane diol, 1397 g calcined china clay, 45 g fumed silica, 6 g POLYCAT™ SA 1/10 catalyst (62 percent of 1,8 diazabicyclo 5,4,0 undecene blocked with phenolic acid) 1.0 g DABCO™ 33LV catalyst (33 percent triethylene diamine in dipropylene glycol) are mixed in a planetary blender under vacuum at 60° C. for 1 hour. The finished blend is filled into water vapor proof cartridges.

EXAMPLE 7

Application of Sealant 1

Component A1 and Component B1 are extruded out of the two cartridges through a static mixer 8×8 mm with 24 mixing elements in a volumetric ratio of 1.0 to 1.0. The mixture is extruded onto a substrate of sheet molding compound cleaned with n-heptane.

EXAMPLE 8

Application of Sealant 2

Component A2 and Component B2 are extruded out of the two cartridges through a static mixer 8×8 mm with 24 mixing elements in a volumetric ratio of 1.0 to 1.0. The mixture is extruded onto a substrate of steel cleaned with n-heptane.

EXAMPLE 9

Preparation of Pre-Polymer 3

570 g of polymeric MDI having a functionality of 2.7 and 1332 g modified 4,4'-MDI (equivalent weight 180, isocyanate content of 23 percent by weight) are weighed into a lab reactor at a temperature 50° C., then 948 g polypropyleneoxide diol MW 2000 as described in Example 1 and 150 g polypropylene oxide diol MW 1000 (70° C.) are added. The reactor is kept at 70° C. for 1 hour.

EXAMPLE 10

Preparation of Component A3

2700 g of prepolymer 3, 267 g talc, 30 g fumed silica and 3 g color paste are mixed in a planetary blender under vacuum at 60-80° C. for 1 hour. The finished blend is filled into water vapor proof cartridges.

EXAMPLE 11

Preparation of Component B3

1599 g Polypropylene oxide (glycerine initiated about 3.5 monomer units triol MW 700), 36 g dipropylene glycol, 36 g polyoxypropylene tri-amine MW 400, 24 g diethyl toluene diamine, 1095 g talc, 45 g fumed silica, 15 g DABCO™ 33 LV and 150 g MOLSIEVE™ 3A are mixed in a planetary blender under vacuum at 30° C. for 1 hour. The finished blend is filled into water vapor proof cartridges.

EXAMPLE 12

Application of Sealant 3

Component A3 and Component B3 are extruded out of the two cartridges through a static mixer 8×8 mm with 24 mixing elements in a volumetric ratio of 1.0 to 1.0. The mixture is extruded onto a substrate of sheet molding compound cleaned with n-heptane.

The compositions of Examples 7, 8 and 12 are cured for 7 days at 23° C., 50 percent relative humidity. The viscosity is determined for each example immediately after mixing. Viscosity A is determined by Physica MC 20, CP 20, D=1.075s$^{-1}$ Viscosity B is determined by Physica MC 20, CP 20, D=1.075s$^{-1}$. Open time is determined by wooden spatula on adhesive bead of 5 mm diameter, where the time is determined as the time from application until residue no longer sticks on the spatula. Tensile strength, elongation and Young's-Modulus are determined according to DIN 53504. G-Modulus is determined according to DIN EN 6721-2. Lap shear strength is determined according to DIN53283. Tg (glass transition temperature) is determined using DSC Mettler TA 821. The glass transition temperature of the resulting cured composition is determined by the following procedure. 10 to 30 mg of the polymer is weighed into a DSC pan and heated by a scan from 25° C. to 175° C. at a heating rate of 20° C./min in order to anneal the polymer. The glass transition temperature is determined by a second scan around the expected Tg within a total range of −60° C. to 240° C. and a heating rate of 10° C./min.

| Properties | Example 7 | Example 8 | Example 12* |
|---|---|---|---|
| Viscosity A-Comp. Pa · s | 100 | 200 | 32 |
| Viscosity B-Comp. Pa · s | 90 | 220 | 65 |
| Mixing ration by volume | 1.0 to 1.0 | 1.0 to 1.0 | 1.0 to 1.0 |
| Open time, min | 10 | 5 | 20 |
| Tensile strength, MPa | 17 | 12 | 15 |
| Elongation, % | 106 | 220 | 100 |
| Young's-Modulus, 23° C. | 385 | 28 | 690 |
| G-Modulus, MPa | 185 | 10 | 357 |
| Lap shear strength, MPa | 13 | 13 | 15 |
| Tg, DSC, ° C. | −46 | −45 | 11 |

*Not an example of the invention

Figure 2:
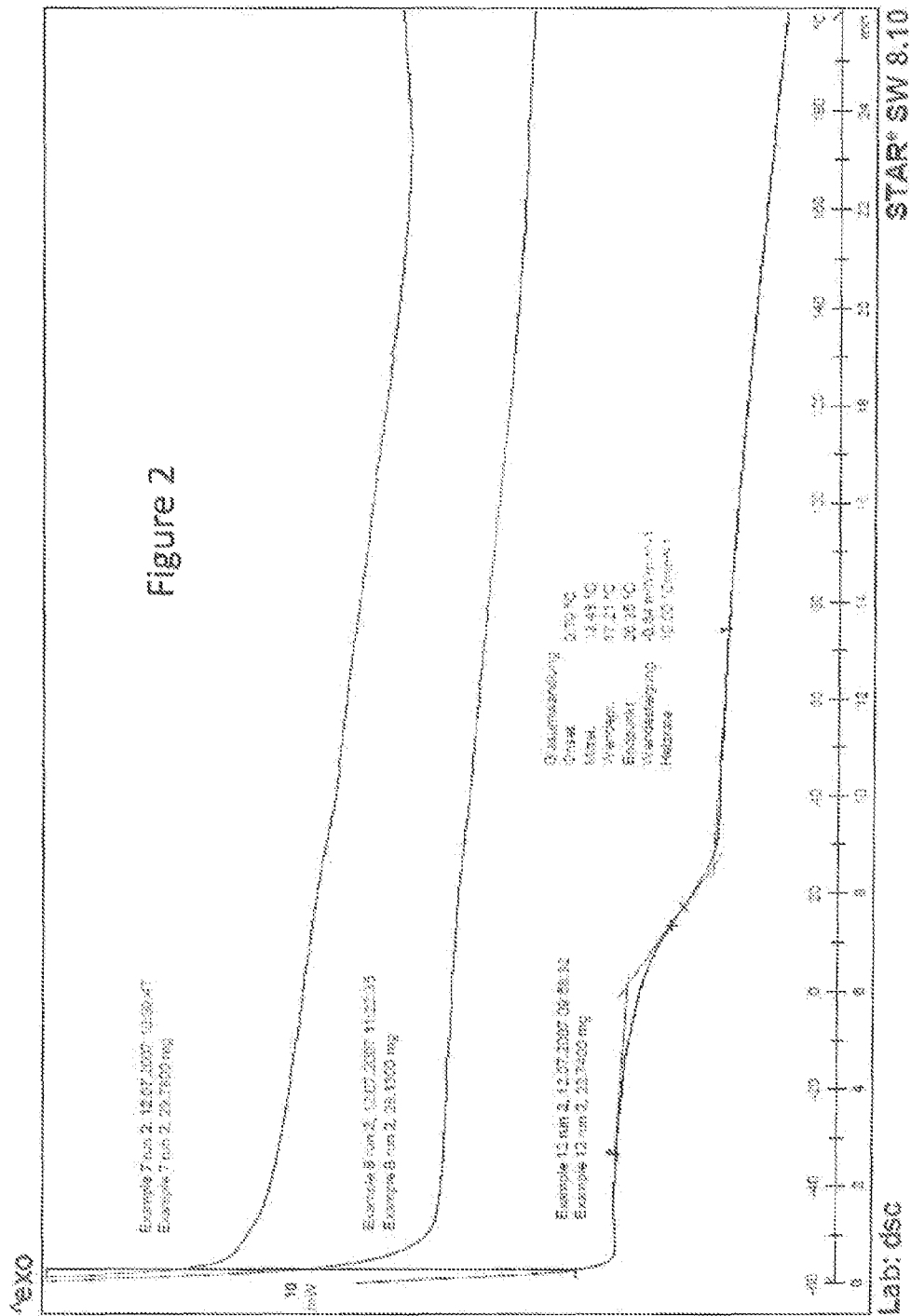
FIG. 2 provides DSC curves of the cured compositions of Examples 7, 8 and 12.

Examples 7 and 8 illustrate those examples according to the invention show a very low Tg combined with a high G-Modulus. Shear modulus versus temperature dependence of the cured sealants of examples 7, 8, and 12 is determined by torsion pendulum test. (Frequency 1 Hz, Sample size 100× 10×2 mm). The results are illustrated in FIG. 1. FIG. 1 demonstrates the samples according to the invention show a very low G-modulus versus temperature dependence. The DSC for the cured adhesives of Examples 7, 8 and 12 is illustrated in FIG. 2. Reference Example 12 shows that prior art adhesives demonstrate glass transition temperature in the range of use temperatures. Examples 7 and 8 do not demonstrate a glass transition temperature in the range of typical use temperatures.

What is claimed is:

1. A two part composition comprising:
   A. an isocyanate functional group containing component comprising one or more polyisocyanates and one or more isocyanate functional group containing prepolymers having in their backbones the residue of one or more chains of one or more polypropylene oxide, copolymers of ethylene oxide and propylene oxide or mixtures thereof wherein equivalent weight of the chains are predominantly greater than about 780 and the prepolymer having a molecular weight of about 2,000 or greater and a functionality of 2 or greater, wherein the isocyanate functional prepolymer ahs an isocyanate content of about 6 to about 35 percent by weight;
   B. an isocyanate reactive component comprising one or more polypropylene oxides, copolymers of ethylene oxide and propylene oxide or mixtures thereof having equivalent weights predominantly about 960 or greater and terminal groups which are reactive with isocyanate groups;
   C. one or more low molecular weight compounds having two or more isocyanate reactive groups and a molecular weight of 120 or less comprising one or more multifunctional alcohols, multifunctional alkanol amines, one or more adducts of multifunctional alcohol and an alkylene oxide, one or more adducts of a multifunctional alkanol amine and an alkylene oxide or a mixture thereof with the proviso that the adducts containing alkylene oxides have an average 1.5 alkylene oxide units or less per chain and the low molecular weight compounds contain straight chain hydrocarbon backbones wherein the low molecular weight compounds are present as a residue in the isocyanate functional group containing prepolymer, as a component of the isocyanate reactive component or both;
   D. one or more catalysts for the reaction of isocyanate functional groups with isocyanate reactive groups wherein the catalyst may be located in the isocyanate functional group containing component or the isocyanate reactive component; and
   E. one or more fillers present in an amount of greater than 10 percent by weight of the composition;
   wherein the catalyst comprises one or more diazabicycloalkanes and one or more diazabicycloalkene salts and the mole ratio of the one or more diazabicycloalkanes to the one or more diazabicycloalkane salts is about 9.0:1.0 to about 1.0:9.0;
   wherein the composition exhibits a glass transition temperature of about −40° C. or less and a G-modulus of 8 MPa or greater after complete cure.

2. A co composition according to claim 1 which comprises:
   A. from about 20 to about 80 percent by weight of isocyanate group containing component based on the weight of the composition;
   B. from about 20 to about 70 percent by weight of one of more polypropylene oxides, copolymers of ethylene oxide and propylene oxide or mixtures thereof based on the weight of the composition;
   C. from about 2 to about 10 percent by weight of one or more low molecular weight compounds based on the weight of the composition; and
   D. from but 0.006 to about 5 percent by weight of one or more catalysts based on the weight of the composition.

3. A composition according to claim 1 wherein the catalyst D is located in part B the curative section.

4. A composition according to claim 1 wherein the copolymers of ethylene oxide and propylene oxide contain about 5 percent by weight or greater of ethylene oxide units and about 40 percent by weight or less of ethylene oxide units.

5. A composition according to claim 4 wherein the isocyanate reactive component comprises copolymers of ethylene oxide a propylene oxide and the copolymers of ethylene oxide and propylene oxide and the residue of one or more chains of one or more copolymers of ethylene oxide and propylene oxide in the one or more isocyanate functional group containing prepolymers comprise one or more polypropylene oxide chains which are capped with one or more ethylene oxide units.

6. A composition according to claim 1 wherein the low molecular weight compound is one or more straight chained diols.

7. A composition according to claim 1 wherein the low molecular weight compound is one or more straight chained diols having an even number of carbons selected from the group of ethane diol 1,4 butane diol and 1,6-hexane diol.

8. A composition according to claim 1 wherein the low molecular weight compounds consist essentially of compounds containing straight chain hydrocarbon backbones.

9. A composition according to claim 1 wherein the low molecular weight component, the one or more isocyanate functional group containing prepolymers and the one or more polypropylene oxides, copolymers of ethylene oxide and propylene oxide or mixtures thereof are miscible prior to cure and the low molecular weight component and the one or more isocyanate functional group containing prepolymers and the one or more polypropylene oxides, copolymers of ethylene oxide and propylene oxide or mixtures thereof from separate phases after cure.

10. A two part composition comprising:
   A. an isocyanate functional group containing component comprising one or more polyisocyanates and one or more isocyanate functional group containing prepolymers having in its backbone the residue of one or more polypropylene oxide chains, copolymers of ethylene oxide and propylene oxide or mixtures thereof wherein the polypropylene oxide residue or copolymers of ethylene oxide and propylene oxide are predominantly 15 monomer units or greater and the prepolymer having a molecular weight of about 2,000 or greater and a functionality of 2 or greater, wherein the isocyanate functional prepolymer has an isocyanate content of about 6 to about 35 percent by weight;
   B. an isocyanate reactive component comprising one or more polypropylene oxides, copolymers of ethylene oxide and propylene oxide or mixtures thereof wherein the one or more polypropylene oxides, copolymers of ethylene oxide and propylene oxide or mixtures thereof is predominantly 20 monomer units or greater and have terminal groups which are reactive with isocyanate groups;
   C. one or more low molecular weight compounds having two or more isocyanate reactive groups and a molecular weight of 120 or less comprising one or more multifunctional alcohols, multifunctional alkanol amines, one or more adducts of multifunctional alcohol and an alkylene oxide, one or more adducts of a multifunctional alkanol amine and an alkylene oxide or a mixture thereof with the proviso that the adducts containing alkylene oxides have on average 1.5 alkylene oxide units or less per chain and the low molecular weight compounds contain straight chain hydrocarbon backbones wherein the low molecular weight compounds are present as a residue in the isocyanate functional group containing prepolymer, as a component of the isocyanate reactive component or both;
   D. one or more catalysts for the reaction of isocyanate functional groups with isocyanate reactive groups wherein the catalyst may be located in the isocyanate functional group containing component of the isocyanate reactive component; and
   E. one or more fillers present in an amount of greater than 10 percent by weight of the composition;
   wherein the catalyst comprises one or more diazabicycloalkanes and one or more diazabicylco alkene salts and mole ratio of one, or more diazabicycloalkanes to the one of more diazabicycloalkane salts is about 9.0:1,0 to about 1.0:9.0;
   wherein the composition exhibits a glass transition temperature of about −40° C. or less and a G-modulus of 8 MPa or greater after complete cure.

11. A composition according to claim 10 which comprises:
   A. from about 2 to bout 80 percent by weight of isocyanate functional group containing component based on the weight of the composition;
   B. from about 20 to about 70 percent by weight of the one or more polypropylene oxides, copolymers of ethylene oxide and propylene oxide or mixtures thereof based on the weight of the composition;
   C. from about 2 to about 10 percent by weight of one or more molecular weight compounds based on the weight of the composition; and
   D. from about 0.006 to about 5.0 percent by weight of one or more catalysts based on the weight of the composition.

12. A composition according to claim 10 wherein the isocyanate reactive component comprises one or more polypropylene oxides, copolymers of ethylene oxide and propylene oxide or mixtures thereof having predominantly about 20 monomer units to about 50 monomer units.

13. A composition according to claim 12 wherein the copolymers of ethylene oxide and propylene oxide contain but 5 percent by weight or greater of ethylene oxide units and about 40 percent by weight or less of ethylene oxide units.

14. A composition according to claim 10 wherein the low molecular weight compound is located in Part B the isocyanate reactive component.

15. A composition according to claim 10 wherein the low molecular weight compound is one or more straight chained diols.

16. A composition according to claim 10 wherein the low molecular weight compound is one or more straight chained diols having an even number of carbons selected from the group of ethane diol, 1,4 butane diol and 1,6-hexane diol.

17. A composition according to claim 10 wherein the low molecular weight compounds consist essentially of compounds containing straight chain hydrocarbon backbones.

18. A composition according to claim 10 wherein the low molecular weight component, the one or more isocyanate functional group containing prepolymers and the one or more polypropylene oxides, copolymers of ethylene oxide and propylene oxide or mixtures thereof are miscible prior to cure and the low molecular weight component and the one or more isocyanate functional group containing prepolymers and the one or more polypropylene oxides, copolymers of ethylene oxide and propylene oxide or mixtures thereof from separate phases after cure.

19. A method of bonding two or more substrates together comprising
   i) contacting Part A and Part B according to claim 1;
   ii) contacting the mixture of step i) with one or more substrates;
   ii) contacting the substrates together with the mixture of step i) disposed between the substrates;
   iv) allowing the mixture of step i) to cure so as to bond the substrates together.

20. A method according to claim 19 wherein the re of the ire of step i) is accelerated, by exposing the substrates with the mixture of step i) disposed between the substrates to elevated temperatures.

* * * * *

UNITED STATES PATENT AND TRADEMARK OFFICE
CERTIFICATE OF CORRECTION

PATENT NO. : 8,399,595 B2  
APPLICATION NO. : 12/177706  
DATED : March 19, 2013  
INVENTOR(S) : Ulrich Tribelhorn et al.

Page 1 of 1

It is certified that error appears in the above-identified patent and that said Letters Patent is hereby corrected as shown below:

In the Claims:

Col. 21, Line 63, delete "ahs" and replace with "has"  
Col. 22, Line 30, delete "diazabicycloalkane" and replace with "diazabicycloalkene"  
Col. 22, Line 35, delete "co"  
Col. 22, Line 37, insert after "isocyanate" the word --functional--  
Col. 23, Line 63, delete "diazabicycloalkane" and replace with "diazabicycloalkene"  
Col. 24, Line 59, delete "re of the ire" and replace with "care of the mixture"

Signed and Sealed this  
Fourteenth Day of May, 2013

Teresa Stanek Rea  
*Acting Director of the United States Patent and Trademark Office*